(12) United States Patent
Le

(10) Patent No.: US 8,726,273 B2
(45) Date of Patent: May 13, 2014

(54) SPACE EFFICIENT VIRTUAL MACHINES

(75) Inventor: Bich Cau Le, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 352 days.

(21) Appl. No.: 12/629,950

(22) Filed: Dec. 3, 2009

(65) Prior Publication Data

US 2011/0138383 A1    Jun. 9, 2011

(51) Int. Cl.
*G06F 9/455* (2006.01)

(52) U.S. Cl.
USPC ............................................................ 718/1

(58) Field of Classification Search
None
See application file for complete search history.

(56) References Cited

U.S. PATENT DOCUMENTS

| | | | |
|---|---|---|---|
| 7,356,679 B1 * | 4/2008 | Le et al. | 713/1 |
| 2004/0078636 A1 * | 4/2004 | Suzaki | 714/6 |
| 2005/0193160 A1 * | 9/2005 | Bhatt et al. | 711/3 |
| 2010/0070725 A1 * | 3/2010 | Prahlad et al. | 711/162 |
| 2010/0306173 A1 * | 12/2010 | Frank | 707/640 |

* cited by examiner

*Primary Examiner* — Emerson Puente
*Assistant Examiner* — Sisley Kim

(57) ABSTRACT

A method and a system of making a virtual machine space efficient are disclosed. The virtual machine includes a virtual disk. The method includes creating a temporary virtual disk and adding the temporary virtual disk to the virtual machine. The temporary virtual disk works in conjunction with the virtual disk. The virtual machine is configured to store temporary files in the temporary virtual disk rather than the virtual disk.

9 Claims, 3 Drawing Sheets

SPACE EFFICIENT VIRTUAL MACHINES

BACKGROUND

In virtualized systems, virtual machines run in virtualization softwares such as a hypervisor (e.g., VMware ESX Server™, Microsoft Hyper-V™, etc.). Virtualization softwares provide functionality to disassociate virtual machines from the underlying hardware by providing virtualized devices and resources to virtual machines. For example, a virtual machine is provided with a virtual disk, which appears to the operating system or applications running in the virtual machine as a real hard drive.

A virtual disk can be configured to be a thin virtual disk or a thick virtual disk. In case of a thick virtual disk of a certain size, the virtualization software allocates the full amount of storage in the underlying real hard drive or any other type of underlying physical storage. For example, if a virtual disk is configured to be of size 10 GB, full 10 GB space is allocated in the underlying physical storage right in the beginning. On the other hand, in case of a thin virtual disk of size 10 GB (for example), the virtualization software typically allocates a small storage to begin with, in the underlying physical storage. More physical storage is allocated to the thin virtual disk as needed. Hence a thin virtual disk can provide space savings on a physical disk or storage because the actual physical space occupied by a think disk generally includes only those blocks that have been written at least once since the virtual disk's creation.

Unfortunately, guest software running inside of a virtual machine using thin virtual disks can negate those space savings by writing temporary data. When this data is written to a block location never written before, it causes the thin virtual disk to grow in size. Later, when the guest software deletes the data, the thin disk does not shrink because the thin disk is unaware that the blocks are no longer used by the guest. This behavior can therefore cause thin disks to occupy more space on physical disks or storage than they need to occupy.

SUMMARY

In one embodiment, a method of making a virtual machine space efficient is disclosed. The virtual machine includes a virtual disk. The method includes creating a temporary virtual disk and adding the temporary virtual disk to the virtual machine. The temporary virtual disk works in conjunction with the virtual disk. The guest software (e.g., applications and operating system) running in the virtual machine is configured to store temporary files in the file system of the temporary virtual disk.

In another embodiment, a virtualization system is disclosed. The virtualization system includes a host having a physical disk drive and a hypervisor running on the host and hosting a virtual machine. A virtual disk is associated with the virtual machine. A temporary virtual disk is also associated with the virtual machine. The guest software (e.g., applications and operating system) running in the virtual machine is configured to write temporary files associated with applications running in the virtual machine, in to the file system of the temporary virtual disk and not into the file system of the virtual disk.

In yet another embodiment, a computer readable media having programming instruction for making a virtual machine space efficient is disclosed. The virtual machine includes a virtual disk. The computer readable media includes programming instructions for creating a temporary virtual disk and programming instructions for adding the temporary virtual disk to the virtual machine. The temporary virtual disk works in conjunction with the virtual disk. The computer readable media further includes programming instructions for configuring the software running in the virtual machine to store temporary files in the file system of the temporary virtual disk.

DETAILED DESCRIPTION

Figure 1:
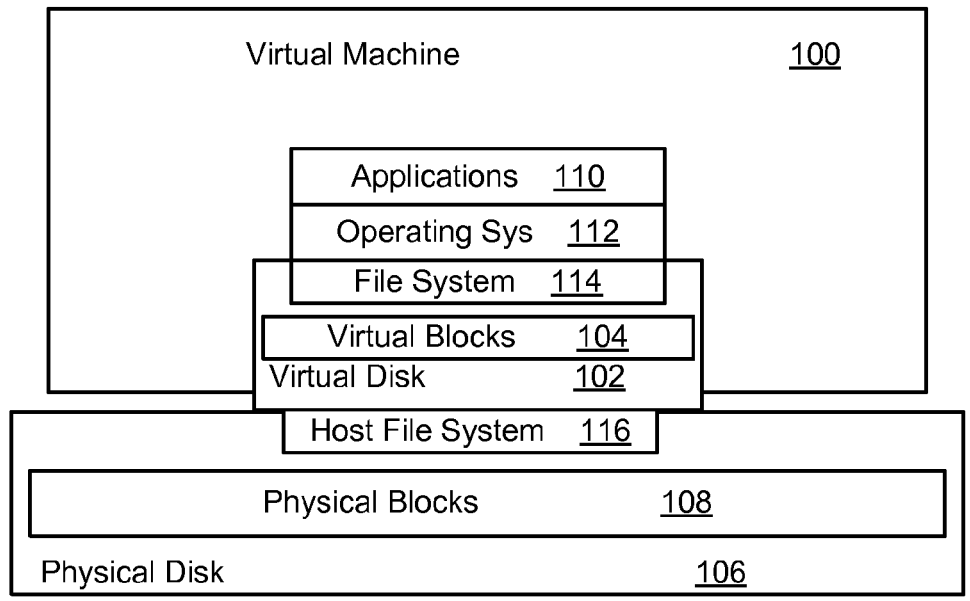
FIG. 1 illustrates a logical diagram of a virtual machine, a virtual disk and a physical disk.

FIG. 1 illustrates a logical arrangement of a physical disk 106, a virtual disk 102 and a virtual machine 100. A virtual machine runs in a virtualized environment which is generally created by installing a hypervisor on a physical host. A virtual machine uses virtual devices and hardware such as a virtual processor, virtual network interface card, virtual disk, etc. These virtualization details are well known in the art, hence a detailed discussion is being omitted.

Virtual machine 100 uses virtual disk 102, which is viewed as a normal storage disk by guest software (such as an operating system 112 and applications 110) running in virtual machine 100. Virtual disk 102 includes virtual blocks 104, which are used by applications or operating system running in virtual machine 100 to store file data. These virtual blocks 104 represent storage space in virtual disk 102. In one embodiment, a virtual disk provides normal file system capabilities to applications running in virtual machine 100. However, the virtual disk itself may be stored as a single file in physical disk 106. In other embodiment, virtual disk 102 may be stored on physical disk 106 in multiple files form.

When guest software stores data in virtual blocks 104 of virtual disk 102 (which appears to be a normal storage device to guest software), through file system 114, the previously unused virtual blocks are marked as "used." To store this data in physical blocks 108 in physical disk 106, more physical blocks are allocated for data by host file system 116. When guest software deletes some data, file system 114 marks corresponding virtual blocks as unused. However, host file system 116 remains unaware of this reclamation of virtual blocks by guest software. Hence, host file system continues treating the underlying corresponding physical blocks as "used." Hence, the size of virtual disk 102 as stored in physical disk 106 does not shrink.

Figure 2:
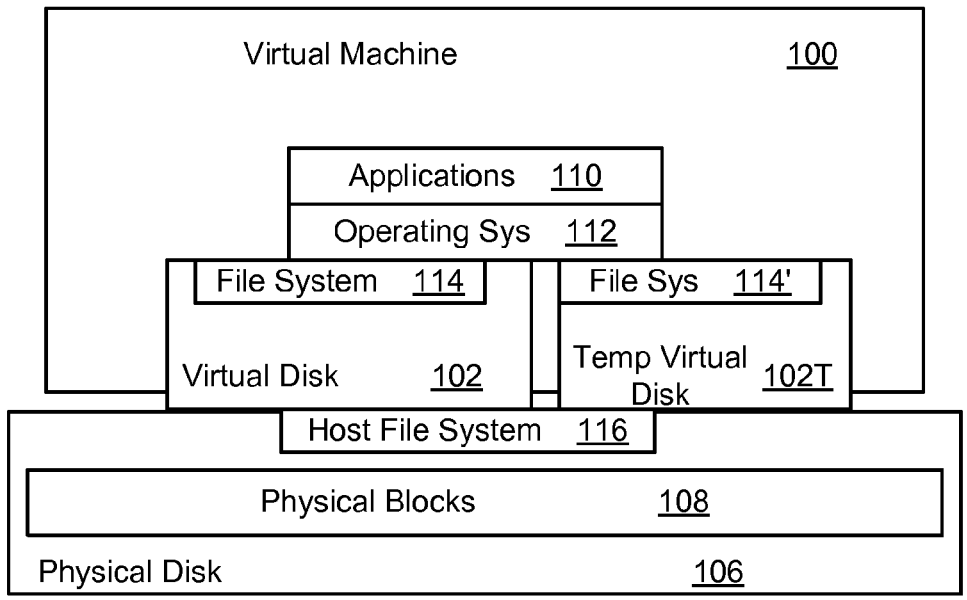
FIG. 2 illustrates a logical diagram of a virtual machine configured to use more than one virtual disks in accordance with one or more embodiments of the present invention.

FIG. 2 illustrates a logical diagram of virtual machine 100 configured to use more than one virtual disks 102, 102T. Virtual disk 102T has its own file system 114'. Applications and operating system (i.e., guest software) running in virtual machine 100 create temporary files for the duration of a session and then either delete these temporary files or don't use these files during the next session. However, since host file system 116 remains unaware of these file deletions (because file system 114 marks virtual blocks unused but the status of corresponding physical blocks remain the same), the size of virtual disk 102 in physical disk 106 does not shrink. Over the period of time in which virtual disk 102 remains in use, the size occupied by virtual disk 102 on physical disk 106 continues to grow. Temporary files are files that are created and used by guest software during one power-on session only.

In one embodiment, virtual machine 100 is configured to use more than one virtual disks. A temporary virtual disk 102T is created every time virtual machine 100 is started. Temporary virtual disk 102T is configured to be used for storing temporary files. When virtual machine 100 shuts down or powered off, temporary virtual disk 102T is deleted.

A virtual disk is composed of one or more files. Taking at least one snapshot results in one base disk and one or more delta disk files. In another embodiment, a snapshot of temporary virtual machine 102T is taken upon power-on of virtual machine 100, thereby creating a delta disk (or redo log file). A snapshot of a virtual disk is typically taken to preserve the state of the virtual disk so the virtual disk can be reverted back the same state at a later time. In one embodiment, this delta disk is deleted during power off. In other words, the snapshot is reverted back to its original state during powering off. In another embodiment, the delta disk is preserved upon a power off operation and continues to persist until a user explicitly reverts the virtual disk back to its original state. During the powered on period of virtual machine 100 any "write" to temporary virtual disk 102T is routed to the delta disk. Hence, temporary files are written to this delta delta disk. The term "non-persistent" means that the information saved in the disk is lost when virtual machine 100 is powered off.

Figure 3:
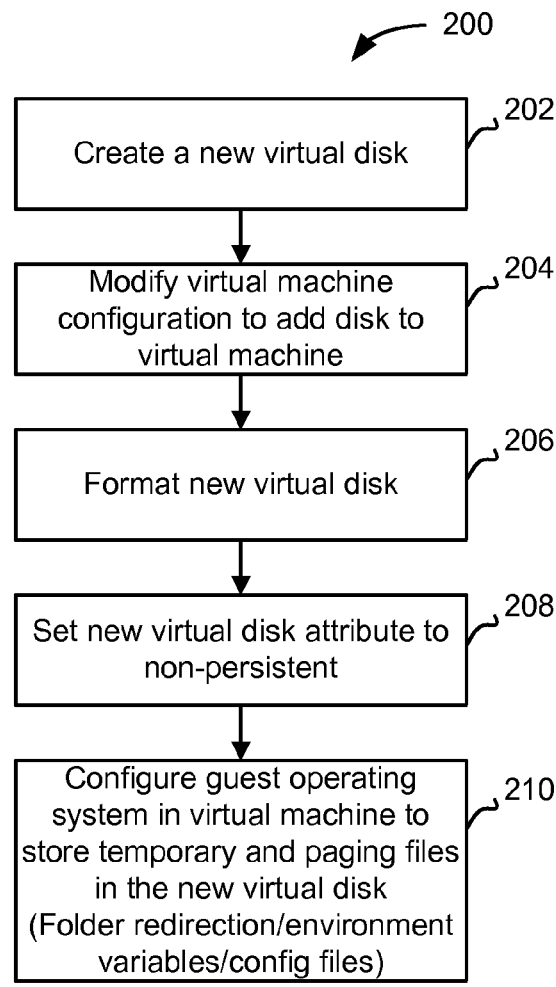
FIG. 3 illustrates a flow diagram of configuring a virtual machine to use a temporary virtual disk for storing temporary files in accordance with one or more embodiments the present invention.

FIG. 3 illustrates a process 200 of adding a temporary virtual disk to a virtual machine. At step 202, a new virtual disk is created. Various virtualization infrastructure providers (for example, VMware, Microsoft, etc.) provide tools, APIs and methods for creating new virtual disk files. For example, VMware Workstation™ product provides a wizard (Add->New Hard Disk->Create a New Virtual Disk) to add a new virtual disk to a virtual machine. At step 204, virtual machine configurations are modified to enable the virtual machine to see this newly added virtual disk. At step 206, the newly created virtual disk is formatted. Disk formatting means creating an empty file system on the disk. With a host file system compatible with guest software, at step 208, the newly created virtual disk is set to be non-persistent. Alternatively, if the underlying platform or virtualization system does not provide functionality to create non-persistent virtual drives, this step may be omitted and process 200 may be repeated every time virtual machine starts. However, if a virtualization platform provides this functionality of creating non-persistent virtual drives, then process 200 only needs to be performed once for a particular virtual machine.

At step 210, applications and guest operating system running in virtual machine 100 are configured to store temporary files in the file system on the newly added temporary virtual disk. In one embodiment, environment variables such as TEMP and TMP (in the case of Microsoft Windows™) may be changed to store temporary files in the file system on the temporary virtual disk (for example, by changing the value of the % TEMP % environment variable c:\temp to d:\temp, wherein drive letter c refers to the file system on the main virtual disk and d to the file system on the temporary virtual disk). In other embodiments, symbolic/hard linking, or folder redirection mechanism may be employed to route temporary file creation to the temporary virtual disk.

Figure 4A:
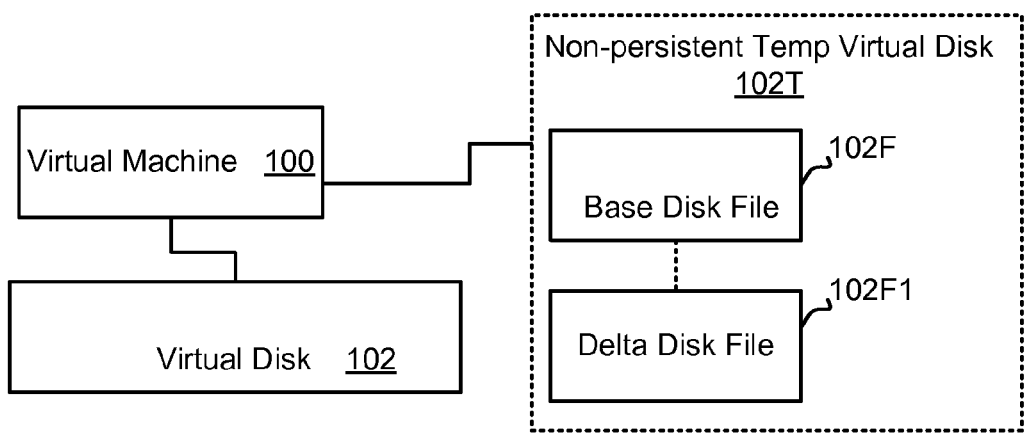
FIGS. 4A and 4B illustrate a method for adding a temporary virtual disk in a virtual machine in accordance with one or more embodiments the present invention.

FIG. 4A illustrates creating and adding a temporary virtual disk to virtual machine 100, in a preferred embodiment. When a temporary and non-persistent virtual disk 102T is added to virtual machine 100, virtual machine 100 creates a snapshot of non-persistent temporary virtual disk 102T at startup. As a result of taking the snapshot operation, a delta disk file 102F1 of base disk 102F is created and all subsequent writes to non-persistent temporary virtual disk 102T are routed to delta disk 102F1. If non-persistent temporary disk 102T is configured in the "non-persistent mode," this delta virtual disk 102F1 is automatically discarded when virtual machine 100 is powered off. In one embodiment, the size of base disk file 102F is kept at the minimum at the time of its creation. Since a snapshot is created every time virtual machine 100 is started, base disk file 102F is not used for write operations, and hence base disk file 102F does not grow in size.

Figure 4B:
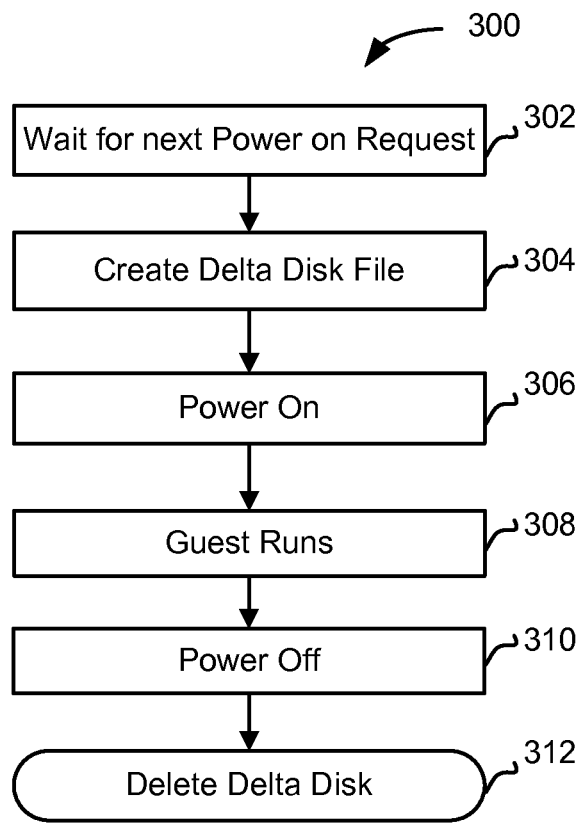

FIG. 4B illustrates a process 300 of creating a delta disk for storing temporary files. At step 302, a request for powering on a virtual machine is entertained. At step 304, a delta disk is created for storing temporary files during the power-on session of the virtual machine. At step 306, the virtual machine is powered on. At step 308, guest software runs and uses the delta disk for storing temporary files. At step 310, the virtual machine is powered off. At step 312, the delta disk is deleted.

Figure 5:
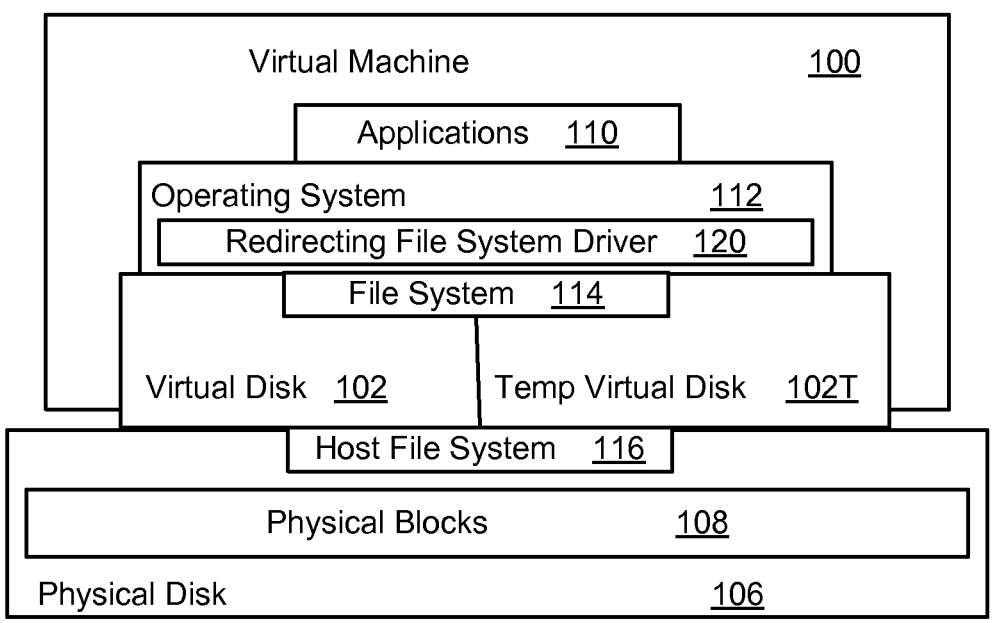
FIG. 5 illustrates a logical diagram of a system including a redirecting file system driver in accordance with one or more embodiments of the present invention.

FIG. 5 illustrates FIG. 2 in another embodiment. A redirecting file system driver 120 is inserted between virtual machine 100 and virtual disks 102, 102T. With redirecting file system driver 120 monitoring write operations to file systems, step 210 of process 200 (FIG. 3) does not need to be performed in this embodiment. In one embodiment, all file operations go through redirecting file system driver 120. Redirecting file system driver 120 is configured to separate out temporary file data and automatically send this temporary file data to temporary virtual disk 102T, without a need to configure the guest operating system and applications in virtual machine 100. In one embodiment redirecting file system driver 120 is a part of a file system driver. In another embodiment redirecting file system driver 120 exists separately from the file system driver and is loaded when the file system driver is loaded. When this temporary file data is needed by guest software, redirecting file system driver 120 automatically redirects read operations to temporary virtual disk 102T.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method of managing a size of a thinly provisioned virtual disk utilized by a virtual machine running on a host system, wherein the thinly provisioned virtual disk comprises at least one file stored in a file system utilized by a hypervisor of the host system, the method comprising:
creating a second virtual disk for the virtual machine, wherein the second virtual disk is backed by a storage space provided in a nonvolatile physical storage;
providing the virtual machine access to the second virtual disk;
before the virtual machine is powered on, creating a delta disk by taking a snapshot of the second virtual disk and configuring the virtual machine to store only temporary files in the delta disk rather than in the thinly provisioned virtual disk and to store other files in the thinly provisioned virtual disk, wherein the temporary files are files that are created and used by software running in the virtual machine during one power-on session, and configuring the virtual machine further comprises:
identifying write operations corresponding to the temporary files associated with the file system, and redirecting the write operations to store the temporary files to the delta disk without a need to reconfigure the file system and the software that are running in the virtual machine; and
after the virtual machine is powered off, deleting the delta disk to remove at least some of the temporary files from the file system thereby freeing the storage space in the nonvolatile physical storage.

2. The method as recited in claim 1, wherein the configuring the virtual machine step comprises modifying environment variables in a guest operating system to refer to locations in the second virtual disk, wherein the environment variables correspond to locations for storing the temporary files.

3. A non-transitory computer readable media having programming instruction for managing a size of a thinly provisioned virtual disk utilized by a virtual machine running on a host system, wherein the thinly provisioned virtual disk comprises at least one file stored in a file system utilized by a hypervisor of the host system, the non-transitory computer readable media comprising:
programming instructions for creating a second virtual disk for the virtual machine, wherein the second virtual disk is backed by a storage space provided in a nonvolatile physical storage;
programming instructions for providing the virtual machine access to the second virtual disk;
programming instructions for, before the virtual machine is powered on, creating a delta disk by taking a snapshot of the second virtual disk and configuring the virtual machine to store temporary files in the delta disk rather than in the thinly provisioned virtual disk and to store other files in the thinly provisioned virtual disk, wherein the temporary files are files that are created and used by software running in the virtual machine during one power-on session, and configuring the virtual machine further comprises
identifying a write operations corresponding to the temporary files associated with the file system, and redirecting the write operations to store the temporary files to the delta disk without a need to reconfigure the file system and the software that are running in the virtual machine; and
programming instructions for, after the virtual machine is powered off, deleting the delta disk to remove at least some of the temporary files from the file system thereby freeing the storage space in the nonvolatile physical storage.

4. The non-transitory computer readable media as recited in claim 3, further comprising programming instructions for formatting the second virtual disk prior to a thinly provisioned use of the second virtual disk.

5. The non-transitory computer readable media as recited in claim 3, wherein the program instructions for configuring the virtual machine comprises modifying environment variables in a guest operating system to refer to locations in the second virtual disk, wherein the environment variables correspond to locations for storing the temporary files.

6. A virtualization system, the virtualization system comprising:
a host having a nonvolatile physical disk drive;
a hypervisor running on the host and hosting a virtual machine; and
a thinly provisioned virtual disk associated with the virtual machine, wherein the thinly provisioned virtual disk comprises at least one file stored in a file system utilized by the hypervisor,
wherein the hypervisor is configured to
create a second virtual disk associated with the virtual machine and the file system, wherein the second virtual disk is backed by a storage space provided in the nonvolatile physical disk drive, and provide the virtual machine access to the second virtual disk, and wherein the virtual machine is configured to, before the virtual machine is powered on, create a delta disk by taking a snapshot of the second virtual disk and write and store only temporary files associated with software running in the virtual machine to the delta disk rather than in the thinly provisioned virtual disk and write and store other files to the thinly provisioned virtual disk, wherein the temporary files are files that are created and used by software running in the virtual machine during one power-on session, identify write operations corresponding to the temporary files associated with the file system, and redirect the write operations to store the temporary files to the delta disk without a need to reconfigure the file system and the software that are running in the virtual machine, and after the virtual machine is powered off, delete the delta disk to remove at least some of the temporary files from the file system thereby freeing the storage space in the nonvolatile physical disk drive.

7. The virtualization system as recited in claim 6, wherein the second virtual disk file is a non-persistent virtual disk comprising a base disk and the delta disk.

8. The virtualization system as recited in claim 6, wherein the temporary files are stored in the second virtual disk by referring an environment variable associated with the temporary files to a guest file system on the second virtual disk.

9. The virtualization system as recited in claim 6, wherein write operations performed on the temporary files are redirected to the second virtual disk to store the temporary files in the second virtual disk.

* * * * *